(12) United States Patent
Chinn

(10) Patent No.: US 10,170,880 B2
(45) Date of Patent: Jan. 1, 2019

(54) MOUNT HAVING A MOUNTING PLATE WITH MOUNTING STUDS AND ELECTRICAL CONTACTS

(71) Applicant: Ferno-Washington, Inc., Wilmington, OH (US)

(72) Inventor: Robert C. Chinn, Cummings, GA (US)

(73) Assignee: Ferno-Washington, Inc., Wilmington, OH (US)

( * ) Notice: Subject to any disclaimer, the term of this patent is extended or adjusted under 35 U.S.C. 154(b) by 0 days.

(21) Appl. No.: 15/601,210

(22) Filed: May 22, 2017

(65) Prior Publication Data

US 2017/0256897 A1    Sep. 7, 2017

Related U.S. Application Data

(60) Continuation of application No. 15/133,286, filed on Apr. 20, 2016, now Pat. No. 9,692,194, which is a continuation of application No. 14/633,797, filed on Feb. 27, 2015, now Pat. No. 9,379,504, which is a division of application No. 13/763,853, filed on Feb. 11, 2013, now Pat. No. 8,992,238.

(51) Int. Cl.
| | |
|---|---|
| *H01R 25/00* | (2006.01) |
| *H01R 25/14* | (2006.01) |
| *F16B 21/09* | (2006.01) |
| *H01R 25/16* | (2006.01) |
| *H01R 13/639* | (2006.01) |
| *H01R 107/00* | (2006.01) |

(52) U.S. Cl.
CPC ............ *H01R 25/14* (2013.01); *F16B 21/09* (2013.01); *H01R 13/639* (2013.01); *H01R 25/142* (2013.01); *H01R 25/165* (2013.01); *H01R 2107/00* (2013.01)

(58) Field of Classification Search
CPC .... H01R 25/14; H01R 25/142; H01R 25/165; H01R 13/639
USPC .................................. 439/113, 116, 571–574
See application file for complete search history.

(56) References Cited

U.S. PATENT DOCUMENTS

| | | | |
|---|---|---|---|
| 269,985 | A | 1/1883 | Joseph |
| 619,174 | A | 2/1899 | Harry, II |
| 716,852 | A | 12/1902 | Baker et al. |
| 1,178,360 | A | 4/1916 | Tudor et al. |

(Continued)

FOREIGN PATENT DOCUMENTS

| | | | |
|---|---|---|---|
| CH | | 432266 A | 3/1967 |
| DE | | 2000967 B | 7/1971 |

(Continued)

OTHER PUBLICATIONS

Non-Final Office Action dated Jun. 7, 2017, pertaining to U.S. Appl. No. 15/435,373, filed Feb. 17, 2017.

(Continued)

*Primary Examiner* — Chandrika Prasad
(74) *Attorney, Agent, or Firm* — Dinsmore & Shohl, LLP

(57) ABSTRACT

A modular equipment mount to enable quick relocation of the piece of equipment. The piece of equipment is secured to a mount. A track system is secured to multiple locations where the piece of equipment may be secured. Power and data connections are included with the track system to provide power and data to the piece of equipment through connectors on the mount.

10 Claims, 16 Drawing Sheets

(56) References Cited

U.S. PATENT DOCUMENTS

| | | | |
|---|---|---|---|
| 1,263,918 A | 4/1918 | Miller et al. |
| 1,288,010 A | 12/1918 | Isaac et al. |
| 1,576,034 A | 3/1926 | Butt et al. |
| 1,702,937 A | 2/1929 | Friedemann et al. |
| 1,817,962 A | 8/1931 | Breuer et al. |
| 2,391,051 A | 12/1945 | Windsor et al. |
| 2,456,024 A | 12/1948 | Schofield et al. |
| 2,473,364 A | 6/1949 | Dickinson et al. |
| 2,480,322 A | 8/1949 | Cozzoli et al. |
| 2,556,076 A | 6/1951 | Evans et al. |
| 2,644,591 A | 7/1953 | McMahan et al. |
| 2,685,912 A | 8/1954 | Evans et al. |
| 2,688,504 A | 9/1954 | Parker et al. |
| 3,042,221 A | 7/1962 | Rasmussen et al. |
| 3,116,773 A | 1/1964 | Kikas |
| 3,204,998 A | 9/1965 | Stollenwerk et al. |
| 3,358,300 A | 12/1967 | Smith et al. |
| 3,375,936 A | 4/1968 | Kessler et al. |
| 3,392,848 A | 7/1968 | McConnell et al. |
| 3,451,580 A | 6/1969 | Husby |
| 3,480,265 A | 11/1969 | Vagn |
| 3,591,121 A | 7/1971 | Parris |
| 3,605,637 A | 9/1971 | Ernest, Jr. |
| 3,606,619 A | 9/1971 | Stollenwerk et al. |
| 3,613,900 A | 10/1971 | Chiu |
| 3,718,886 A | 2/1973 | Hoffmeister |
| 3,770,234 A | 11/1973 | Fovall et al. |
| 3,840,265 A | 10/1974 | Stirling et al. |
| 3,846,944 A | 11/1974 | Lambert |
| 3,973,818 A | 8/1976 | Soquenne |
| 4,114,947 A | 9/1978 | Nelson |
| 4,170,335 A | 10/1979 | King |
| 4,173,382 A | 11/1979 | Booty |
| 4,178,032 A | 12/1979 | Hone et al. |
| 4,210,355 A | 7/1980 | Legueu et al. |
| 4,230,432 A | 10/1980 | Howell |
| 4,256,424 A | 3/1981 | Knox et al. |
| 4,386,642 A | 6/1983 | Durbin |
| 4,397,432 A | 8/1983 | Resetar et al. |
| 4,423,817 A | 1/1984 | Monjo-Rufi et al. |
| 4,425,978 A | 1/1984 | Star |
| 4,458,864 A | 7/1984 | Colombo et al. |
| 4,513,866 A | 4/1985 | Thomas |
| 4,568,050 A | 2/1986 | Radoy et al. |
| 4,576,319 A | 3/1986 | Brown |
| 4,602,756 A | 7/1986 | Chatfield et al. |
| 4,677,794 A | 7/1987 | Parron et al. |
| 4,763,360 A | 8/1988 | Daniels et al. |
| 4,783,034 A | 11/1988 | Ostrander et al. |
| 4,853,555 A * | 8/1989 | Wheat .................. B64C 1/20 174/82 |
| 4,915,435 A | 4/1990 | Levine |
| 4,974,377 A | 12/1990 | Dominitz et al. |
| 5,007,608 A | 4/1991 | Carroll, Jr. et al. |
| 5,157,409 A | 10/1992 | Hamin |
| 5,207,303 A | 5/1993 | Oswalt et al. |
| 5,383,629 A | 1/1995 | Morgan et al. |
| 5,425,520 A | 6/1995 | Masumoto |
| 5,490,703 A | 2/1996 | Hewko et al. |
| 5,615,848 A | 4/1997 | Ceriani et al. |
| 5,732,965 A | 3/1998 | Willey |
| 5,738,306 A | 4/1998 | Moss et al. |
| 5,755,478 A | 5/1998 | Kamiya et al. |
| 5,779,296 A | 7/1998 | Hewko et al. |
| 5,785,277 A | 7/1998 | Manning et al. |
| 5,815,629 A | 9/1998 | Finzel et al. |
| 5,833,095 A | 11/1998 | Russell et al. |
| 5,850,891 A | 12/1998 | Olms et al. |
| 5,865,314 A | 2/1999 | Jacober |
| 5,886,674 A | 3/1999 | Yoshimi |
| 5,988,409 A | 11/1999 | Gusdorf et al. |
| 6,000,509 A | 12/1999 | Chisholm |
| 6,157,350 A | 12/2000 | House et al. |
| 6,241,109 B1 | 6/2001 | Kautz et al. |
| 6,244,400 B1 | 6/2001 | Bowers |
| 6,273,366 B1 | 8/2001 | Sprenger et al. |
| 6,296,094 B1 | 10/2001 | Knecht |
| 6,367,603 B1 | 4/2002 | Tiramani et al. |
| 6,585,188 B2 | 7/2003 | Alli |
| 6,595,379 B1 | 7/2003 | Powell |
| 6,618,018 B1 | 9/2003 | Sylvester et al. |
| 6,726,075 B1 | 4/2004 | Patel et al. |
| 6,746,138 B1 | 6/2004 | Neeld et al. |
| 6,762,727 B2 | 7/2004 | Rochford et al. |
| 6,789,714 B1 | 9/2004 | Benson et al. |
| 6,945,414 B1 | 9/2005 | Stevens et al. |
| 7,000,810 B1 | 2/2006 | Farmer |
| 7,048,242 B2 | 5/2006 | Oddsen |
| 7,097,204 B2 | 8/2006 | Jessup et al. |
| 7,234,619 B2 | 6/2007 | Hicks et al. |
| 7,328,926 B1 | 2/2008 | Myers et al. |
| 7,502,226 B2 | 3/2009 | Searby et al. |
| 7,507,005 B1 | 3/2009 | Mier-Langner |
| 7,600,619 B2 | 10/2009 | Sapyta |
| 7,654,834 B1 | 2/2010 | Mier-Langner et al. |
| 7,669,945 B2 | 3/2010 | Blersch et al. |
| 7,677,400 B2 | 3/2010 | Bayazit et al. |
| 7,798,323 B1 | 9/2010 | McCann et al. |
| 7,946,771 B2 | 5/2011 | Boneschanscher et al. |
| 7,984,889 B2 | 7/2011 | Whitley et al. |
| 8,167,131 B1 | 5/2012 | Anderson |
| 8,172,077 B1 | 5/2012 | Gray |
| 8,276,795 B1 | 10/2012 | Dean et al. |
| 8,387,783 B2 | 3/2013 | Zack et al. |
| 8,505,794 B2 | 8/2013 | Ardigo |
| 8,636,154 B2 | 1/2014 | Chinn |
| 8,701,952 B1 | 4/2014 | Tripp |
| 8,864,004 B2 | 10/2014 | Crawford et al. |
| 8,992,238 B2 | 3/2015 | Chinn |
| 9,078,501 B2 | 7/2015 | Johnson |
| 9,282,794 B2 | 3/2016 | Farrelly |
| 9,379,504 B2 | 6/2016 | Chinn |
| 9,611,975 B2 * | 4/2017 | Chinn .................. B60P 7/0815 |
| 9,861,178 B1 | 1/2018 | Vanman et al. |
| 9,944,217 B2 | 4/2018 | Schroeder et al. |
| 2003/0143052 A1 | 7/2003 | Fehrle et al. |
| 2004/0178309 A1 | 9/2004 | Crowley et al. |
| 2004/0253856 A1 | 12/2004 | Hoffmann |
| 2005/0039644 A1 | 2/2005 | Sheahan et al. |
| 2005/0232519 A1 | 10/2005 | Grimes |
| 2006/0243766 A1 | 11/2006 | Lan |
| 2006/0255221 A1 | 11/2006 | Tseng |
| 2007/0056921 A1 | 3/2007 | Lo |
| 2007/0097617 A1 | 5/2007 | Searby et al. |
| 2008/0023976 A1 | 2/2008 | Myers et al. |
| 2008/0121730 A1 | 5/2008 | Calkin |
| 2008/0169739 A1 | 7/2008 | Goldenberg |
| 2008/0302553 A1 | 12/2008 | Ross et al. |
| 2009/0014584 A1 * | 1/2009 | Rudduck .................. B60N 2/071 244/118.6 |
| 2009/0014602 A1 | 1/2009 | Frost |
| 2009/0140112 A1 | 6/2009 | Carnevali |
| 2010/0307649 A1 | 12/2010 | Santos Dominguez |
| 2011/0147428 A1 | 6/2011 | Crawford et al. |
| 2012/0006873 A1 | 1/2012 | Chinn |
| 2012/0126075 A1 | 5/2012 | Chinn et al. |
| 2013/0081233 A1 | 4/2013 | Lu |
| 2013/0193179 A1 | 8/2013 | Davidson |
| 2014/0015603 A1 | 1/2014 | Scott et al. |
| 2014/0226315 A1 * | 8/2014 | Nicieja .................. H01R 13/6205 362/127 |
| 2014/0227892 A1 | 8/2014 | Chinn |
| 2014/0374564 A1 | 12/2014 | Schroeder et al. |
| 2016/0031382 A1 | 2/2016 | Chinn et al. |
| 2017/0020249 A1 | 1/2017 | Schroeder et al. |
| 2017/0021775 A1 | 1/2017 | Spector et al. |
| 2017/0158145 A1 | 6/2017 | Chinn et al. |
| 2017/0202330 A1 | 7/2017 | Schroeder et al. |

(56) References Cited

U.S. PATENT DOCUMENTS

| | | | |
|---|---|---|---|
| 2017/0209318 A1 | 7/2017 | Schroeder et al. | |
| 2018/0073676 A1 | 3/2018 | Schroeder et al. | |

FOREIGN PATENT DOCUMENTS

| | | | |
|---|---|---|---|
| DE | 3209091 A1 | 9/1983 | |
| DE | 3209092 A1 | 9/1983 | |
| DE | 3230905 A1 | 2/1984 | |
| DE | 8910460 U1 | 12/1989 | |
| DE | 19716046 A1 | 10/1998 | |
| DE | 202006020143 U1 | 1/2008 | |
| DE | 102009039471 A1 | 3/2011 | |
| DE | 102010024544 A1 | 12/2011 | |
| EP | 0021526 A2 | 1/1981 | |
| EP | 105675 A2 | 4/1984 | |
| EP | 260726 A2 | 3/1988 | |
| EP | 0260726 A2 | 3/1988 | |
| EP | 0583491 A1 | 2/1994 | |
| EP | 583492 A1 | 2/1994 | |
| EP | 972616 A2 | 1/2000 | |
| EP | 1790521 A1 | 5/2007 | |
| EP | 1863119 A1 | 12/2007 | |
| EP | 2206623 A1 | 7/2010 | |
| EP | 2451418 B1 | 5/2013 | |
| EP | 2614804 A1 | 7/2013 | |
| EP | 2614805 A1 | 7/2013 | |
| FR | 1085340 A | 1/1955 | |
| FR | 2481110 A1 | 10/1981 | |
| FR | 2647323 A1 | 11/1990 | |
| FR | 2649007 A1 | 1/1991 | |
| GB | 1530794 A | 11/1978 | |
| GB | 2401541 A | 11/2004 | |
| GB | 2452083 A | 2/2009 | |
| WO | 9115178 A1 | 10/1991 | |
| WO | 9927881 A1 | 6/1999 | |
| WO | 0059466 A1 | 10/2000 | |
| WO | 0059466 A1 | 12/2000 | |
| WO | 2006122351 A1 | 11/2006 | |
| WO | 2011006163 A2 | 1/2011 | |

OTHER PUBLICATIONS

Extended European Search Report from EP Application No. 13163002.2 dated Jun. 11, 2013.

Extended European Search Report from EP Application No. 13163007.1 dated Jun. 11, 2013.

International Search Report and Written Opinion dated Nov. 3, 2011, pertaining to International Application No. PCT/US2010/041724.

International Search Report and Written Opinion dated Jun. 27, 2014, pertaining to International Application No. PCT/US2014/015898.

Office Action dated Jul. 29, 2014, pertaining to Russian Application No. 2012101216.

International Preliminary Report on Patentability, pertaining to International Application No. PCT/US2010/041724 dated Jan. 19, 2012.

Examination Report, pertaining to Australian Application No. 2010271194 dated Nov. 27, 2013.

Office Action pertaining to Chinese Application No. 201080038769.2 dated Jan. 24, 2014.

International Search Report and Written Opinion dated Apr. 16, 2013, pertaining to International Application No. PCT/US2013/026129 dated Apr. 16, 2013.

International Preliminary Report on Patentability, pertaining to International Application No. PCT/US2013/026129 dated Aug. 28, 2014.

Examination Report, pertaining to Australian Application No. 2013203990 dated Aug. 18, 2014.

International Search Report and Written Opinion, pertaining to PCT/2014/012492 dated Apr. 3, 2014.

Preliminary Rejection, pertaining to Korean Application No. 10-2012-7003477 dated Jul. 27, 2015.

Examination Report, pertaining to Canadian Application No. 2767547 dated Jul. 7, 2015.

Examination Report, pertaining to EP Patent Application No. 13163007.1 dated Nov. 17, 2014.

Examination Report, pertaining to Australian Patent Application No. 2014203593 dated Feb. 20, 2015.

Examination Report, pertaining to Australian Patent Application No. 2014203595 dated Jul. 23, 2015.

International Preliminary Report on Patentability, pertaining to International Application No. PCT/US2014/012492 dated Aug. 20, 2015.

International Search Report and Written Opinion dated Mar. 3, 2015, pertaining to International Application No. PCT/US2014/050288.

International Search Report and Written Opinion dated Mar. 3, 2015, pertaining to International Application No. PCT/US2014/050306.

International Search Report and Written Opinion dated Sep. 29, 2015, pertaining to International Application No. PCT/US2014/050392.

Examination Report dated Feb. 5, 2016, pertaining to European Patent Application No. 14703501.8.

Examination Report dated Mar. 1, 2016, pertaining to EP Patent Application No. 14/707550.1.

Official Action dated Feb. 29, 2016, pertaining to Egyptian Patent Application No. PCT/NA/50/2012.

Office Action dated Dec. 22, 2015, pertaining to Chinese Patent Application No. 201410247226.1.

Office Action dated Dec. 16, 2015, pertaining to Japanese Patent Application No. 2015-020347.

Notice of Allowance dated Jan. 20, 2016, pertaining to U.S. Appl. No. 14/633,797.

Examination Report, pertaining to EP Application No. 13163007.1 dated Jun. 11, 2011.

Non-Final Office Action dated May 18, 2018, pertaining to U.S. Appl. No. 15/283,981, 11 pages.

Non-Final Office Action dated May 18, 2018, pertaining to U.S. Appl. No. 15/326,805, 10 pages.

Search Report and Written Opinion dated Jul. 3, 2018, pertaining to Singapore Patent Application No. 10201708458T, 9 pages.

* cited by examiner

MOUNT HAVING A MOUNTING PLATE WITH MOUNTING STUDS AND ELECTRICAL CONTACTS

CROSS REFERENCE TO RELATED APPLICATIONS

This application is a continuation of U.S. patent application Ser. No. 15/133,286 filed Apr. 20, 2016, which is a continuation of U.S. patent application Ser. No. 14/633,797 filed Feb. 27, 2015, which is a divisional of U.S. patent application Ser. No. 13/763,853 filed Feb. 11, 2013, now U.S. Pat. No. 8,992,238, the entire disclosures of all applications being incorporated herein by reference.

TECHNICAL FIELD

The present specification generally relates to mounting systems for equipment and devices.

SUMMARY

In one embodiment, a track may include a backing plate with a number of slots substantially parallel to each other and disposed upon the backing plate. Each slot includes a plurality of open regions and a plurality of necked down regions connecting the plurality of open regions. The track may also include a plurality of electrical contacts disposed along the backing plate and adjacent to at least one of the plurality of slots and at least one of the plurality of electrical contacts are electrically coupled to a power source or data source.

In another embodiment, a mount may include a mounting plate with a back surface and a front surface. The mount may also include at least one mounting stud coupled to the back surface of the mounting plate, where each mounting stud includes a stem portion that extends outwardly from the back surface and an enlarged head portion disposed at a distal end of respective stem portions. The mount may also include a plurality of equipment mounting locations disposed through the mounting plate to secure a piece of equipment to the mount to the front surface and at least one electrical connector secured to the mounting plate and electrically coupled to the piece of equipment. The mount may also include a release mechanism including a locking pin disposed through the mounting plate and extending outwardly from the back surface and at least one locking pin released operatively connected to the locking pin.

In yet another embodiment an equipment mounting apparatus may include the track with a backing plate with a number of slots substantially parallel to each other and disposed upon the backing plate. Each slot includes a plurality of open regions and a plurality of necked down regions connecting the plurality of open regions. The track may also include a plurality of electrical contacts disposed along the backing plate and adjacent to at least one of the plurality of slots and at least one of the plurality of electrical contacts are electrically coupled to a power source or data source. The equipment mount may also include a mount including a mounting plate with a back surface and a front surface. The mount may also include at least one mounting stud coupled to the back surface of the mounting plate, where each mounting stud includes a stem portion that extends outwardly from the back surface and an enlarged head portion disposed at a distal end of respective stem portions. The mount may also include a plurality of equipment mounting locations disposed through the mounting plate to secure a piece of equipment to the mount to the front surface and at least one electrical connector secured to the mounting plate and electrically coupled to the piece of equipment. The mount may also include a release mechanism including a locking pin disposed through the mounting plate and extending outwardly from the back surface and at least one locking pin released operatively connected to the locking pin. The plurality of electrical contacts electrically couple with the at least one electrical connector to provide power or data to the piece of equipment when the mount is secured to the track.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
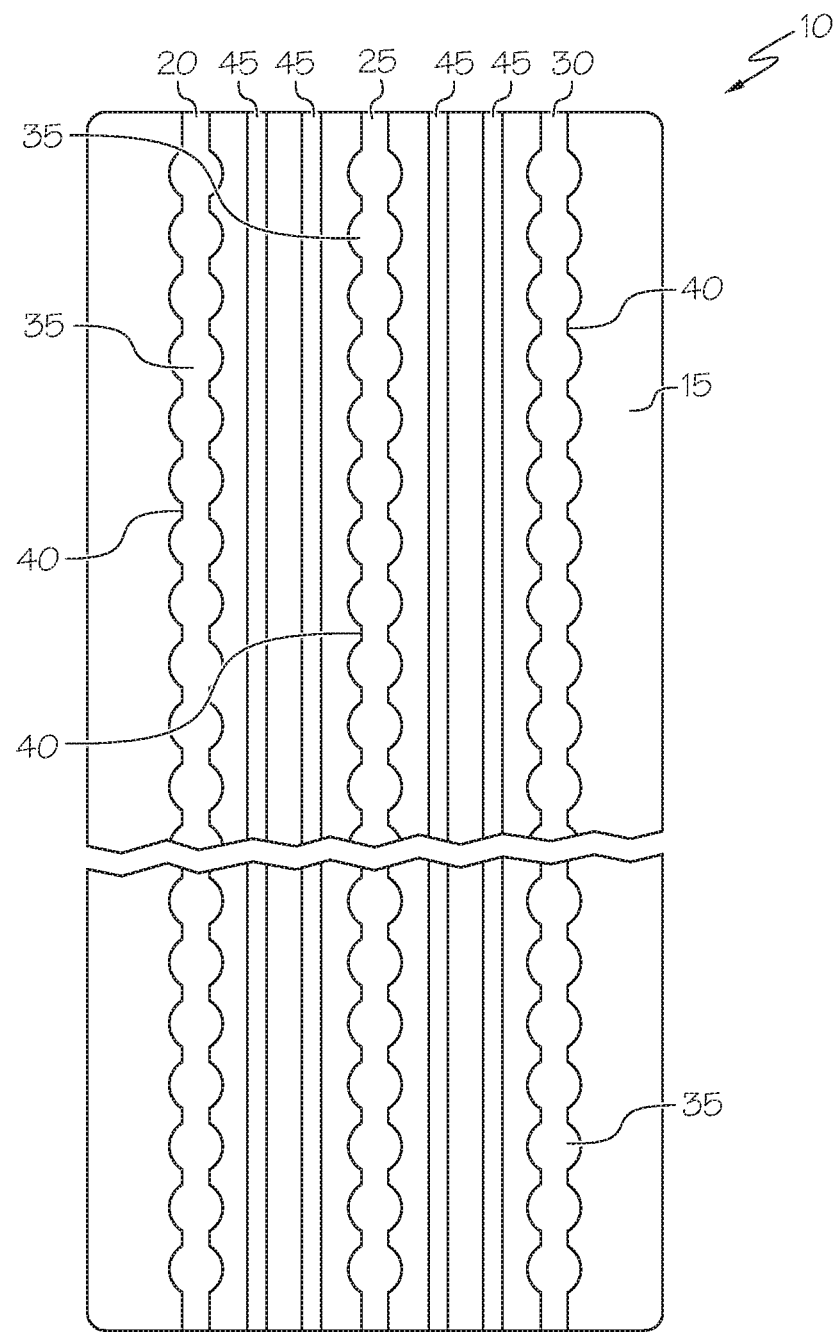
FIG. 1 depicts a front view of a track for use in an electrified equipment mounting system according to one or more embodiments shown and described herein.

The following text sets forth a broad description of numerous different embodiments of the present disclosure. The description is to be construed as illustrative only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

No term is intended to be essential to the present invention unless so stated. To the extent that any term recited in the claims at the end of this patent is referred to in this patent in a manner consistent with a single meaning, that is done for sake of clarity only so as to not confuse the reader, and it is not intended that such a claim term be limited, by implication or otherwise, to that single meaning Referring now to FIG. 1, a front view of a track 10 for use in an electrified equipment mounting system or similar track system is illustrated. While multiple tracks can be used, only one track 10 will be described as multiple tracks of the same track system may have the same or substantially the same features. Furthermore the size, shape, and/or configuration of the track 10 can vary depending on the size of a surface for installation and the equipment to be mounted to the track 10. The track 10 includes a backing plate 15 that may have an elongated, rectangular shape (or any other suitable shape) and a plurality of slots. In some embodiments, the plurality of slots may be three slots; a left slot 20, a center slot 25, and a right slot 30 that are disposed along the backing plate, extend at any length along the backing plate 15, and are adjacent to at least one of the plurality of slots. In other words, the plurality of slots are substantially parallel to each other. Each slot 20, 25 and 30 may have a plurality of open regions 35 that are adjacent to a plurality of necked-down regions 40. In some embodiments, the open regions 35 are symmetrical such that they are spaced equidistant apart and are aligned in widthwise rows along the length of the backing plate 15. As another example, the open regions 35 of one or more of the slots 20, 25 and 30 may not all be equidistant and/or may not be aligned in rows with the other open regions of the other slots.

Figure 13:
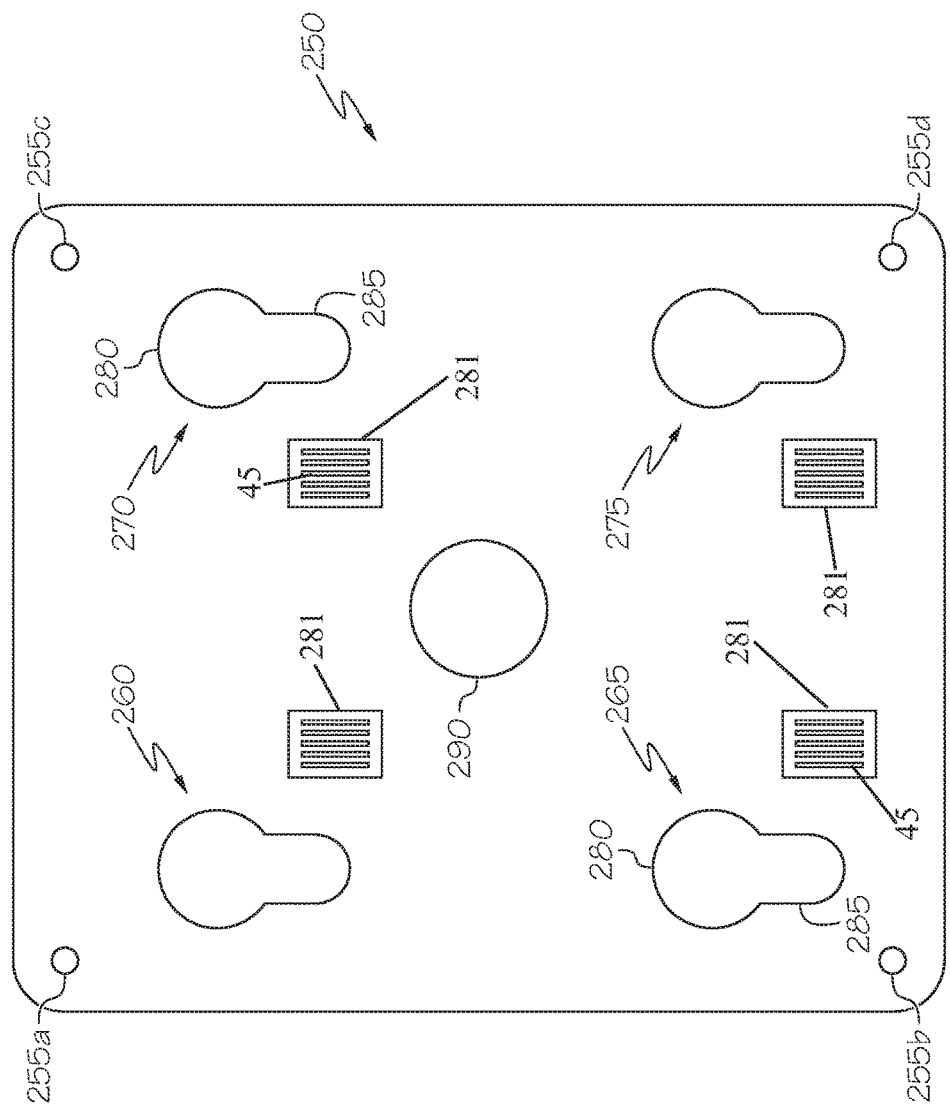
FIG. 13 is a front view a fixed position plate.

The track 10 may have a plurality of electrical contacts 45 electrically coupled to a power supply (not shown) and/or a data source or data sources (not shown). The plurality of electrical contacts 45 may be substantially parallel to the plurality of slots and may extend at any length along the backing plate 15. In some embodiments, the plurality of electrical contacts may be electrically conductive strips or a plurality of pads 281 as shown in FIG. 13. The plurality of electrical contacts 45 may all be electrically coupled to the power source or they all may be electrically coupled to the data source or data sources. Alternatively, the plurality of electrical contacts 45 may have a subset of electrical contacts that are electrically coupled to a power source and a co-existing subset of electrical contacts that are electrically coupled to a data source or data sources. Although the electrical contacts 45 are shown as substantially parallel to the plurality of slots 20, 25, and 30, it is understood that other configurations are possible such as, for example, non-parallel orientations, plug-type contacts, etc.

Figure 2:
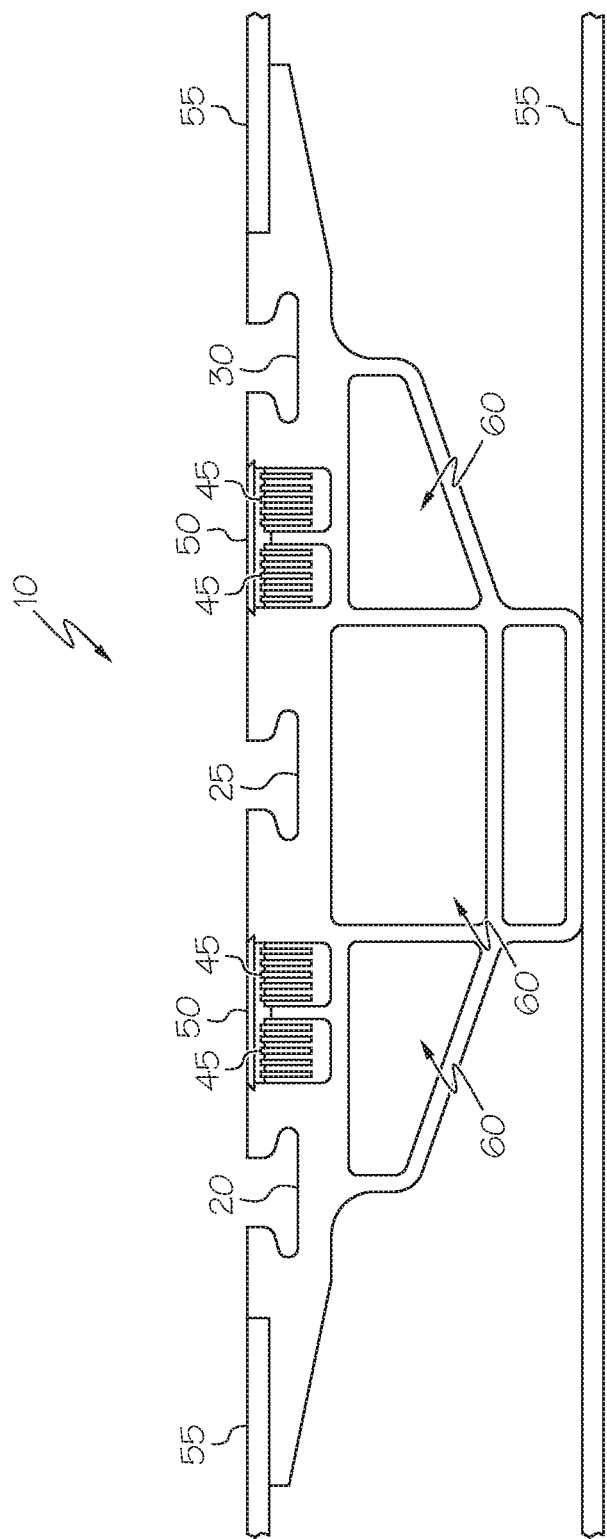
FIG. 2 depicts a side view of the track according to one or more embodiments shown and described herein.

In FIG. 2, a side view of the track 10 is illustrated. The plurality of electrical contacts 45 and the t-shape of the three slots (left slot 20, center slot 25, and the right slot 30) are shown. In some embodiments, the plurality of electrical contacts 45 may be surface mounted and not embedded as shown in FIG. 2. For example the plurality of electrical contacts 45 may be extruded on or formed onto the track 10. The plurality of electrical contacts 45 may have a cover 50 to insulate the plurality of electrical contacts 45. The cover 50 may be removably attached to the track 10. The cover 50 may be cut to insulate only that portion of the plurality of electrical contacts 45 that are exposed to inadvertent contact. In some embodiments, the track 10 may include a plurality of wire raceways 60 that are used to manage and protect electrical conductors.

Figure 3:
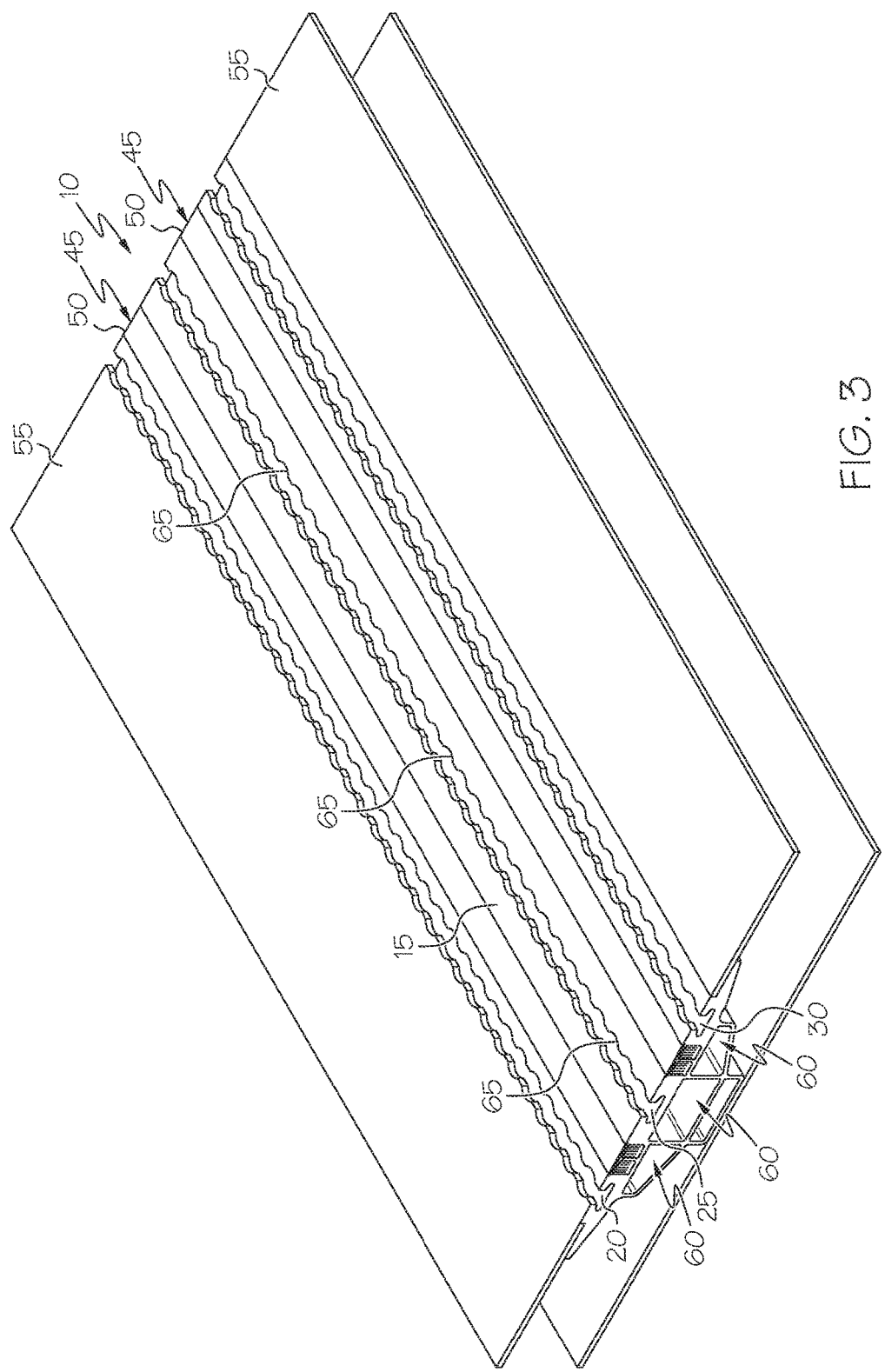
FIG. 3 is a perspective view of the track with a plurality of electrical contacts according to one or more embodiments shown and described herein.

FIG. 3 is a perspective view of the track 10 with the plurality of electrical contacts 45. The plurality of wire raceways 60 may run the length of the track 10 or they may be cut short or have cut-outs to allow at least one wire or an electrical conductor 175 (FIG. 9) to exit the wire raceway 60. In some embodiments, a plurality of raceway access points 65 may be disposed in at least one of the plurality of slots to allow an electrical conductor 175 to pass through the backing plate 15 and into one of the wire raceways 60. A non-limited example is shown in FIG. 3 where raceway access points 65 are located in the center slot 25. For example, the raceway access points 65 may also be located in any of the three slots to include the left slot 20 and/or the right slot 30.

Figure 4:
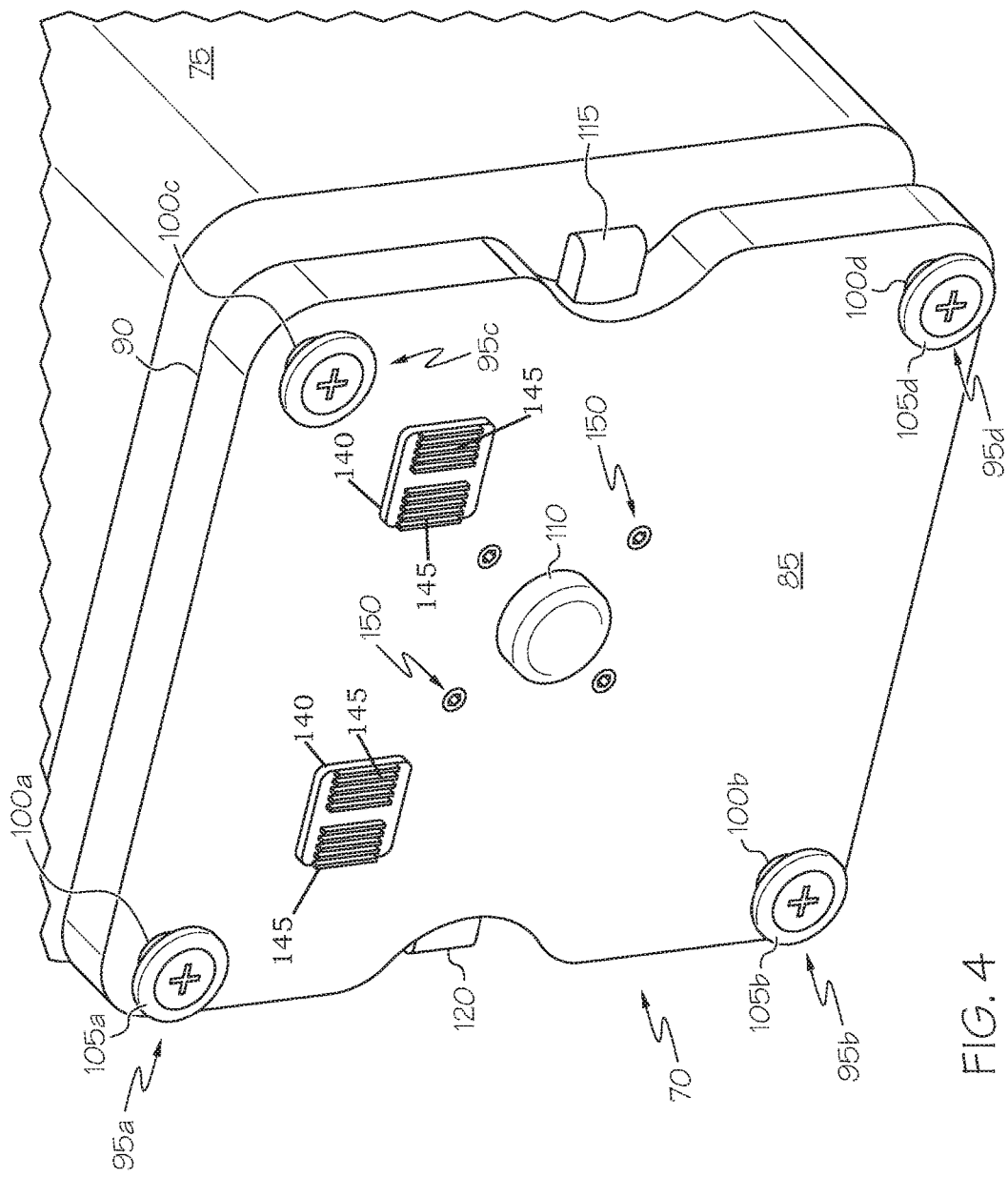
FIG. 4 is a perspective view of a mount attached to a piece of equipment according to one or more embodiments shown and described herein.

FIG. 4 is a perspective view of a mount 70 attached to a piece of equipment 75. The mount 70 has a mounting plate 80, a back surface 85, a front surface 90, and at least one mounting stud 95. For example, the at least one mounting stud 95 may be four mounting studs 95a, 95b, 95c, and 95d. The mount 70 may be operable to be removably connected and/or attached to the track 10 as shown in FIG. 1 or a fixed position plate 250 (FIG. 13). Each mounting stud 95a-d includes a respective stem portion 100a-d that extends outwardly from the back surface 85 and a respective enlarged head portion 105a-d disposed at a distal end of respective stem portions 100a-d. A release mechanism (not shown) with a locking pin 110, and at least one locking pin release may be used to prevent the mount 70 from moving once secured to the track 10 or fixed position plate 250. For example, at least one locking pin release may be a right locking pin release 115 and a left locking pin release 120. The locking pin 110 may be disposed through the mounting plate 80, extending outwardly from the back surface, and may be biased (e.g., by a spring, resilient material, or other biasing means) outward towards an extended lock position for engaging the center slot 25 of the track 10 or the corresponding locking pin opening (not shown, part of the fixed position plate). It should be understood that the locking pin 110 may be located on the mount 70 to engage the right slot 30 or the left slot 25 of the track 10. The locking pin 110 may be retracted using either individually or in combination the right locking pin release 115 or the left locking pin release 120 which is operatively connected to the released mechanism (not shown). It should be understood that both locking pin releases could be oriented in any direction in order to avoid any obstructions, yet still allow the release of the mount 70 from the track 10 or the fixed position plate.

Furthermore, in some embodiments, two or more release levers may need to be actuated in order to release the mounting plate 80 of the mount 70. Such an embodiment may provide for additional security by preventing unwanted movement of the mounting plate 80 when one of the locking pin releases 115 or 120 is accidentally actuated. The front surface 90 may have any device and/or piece of equipment 75 attached to it. In a non-limiting example, a plurality of equipment mounting locations 150 are shown around the locking pin 110 and may be used to secure the piece of equipment 75 to the mount 70. The plurality of equipment mounting locations 150 may be in any configuration to allow any piece of equipment 75 to be secured to the mount 70.

The mount 70 may have at least one electrical connector secured to the mounting plate 80. In some embodiments, the electrical connector is at least one terminal mount 140 disposed on the back surface 85. A plurality of electrical wipers 145 are coupled to the terminal mount 140 and they may be electrically coupled to the piece of equipment 75 attached to the mount 70. In some embodiments, there are an equal amount of electrical wipers 145 as electrical contacts 45 on the track 10. In another embodiment, the electrical wipers may be pads that matedly couple with the pads of the plurality of electrical contacts 45 of the track 10.

Figure 5:
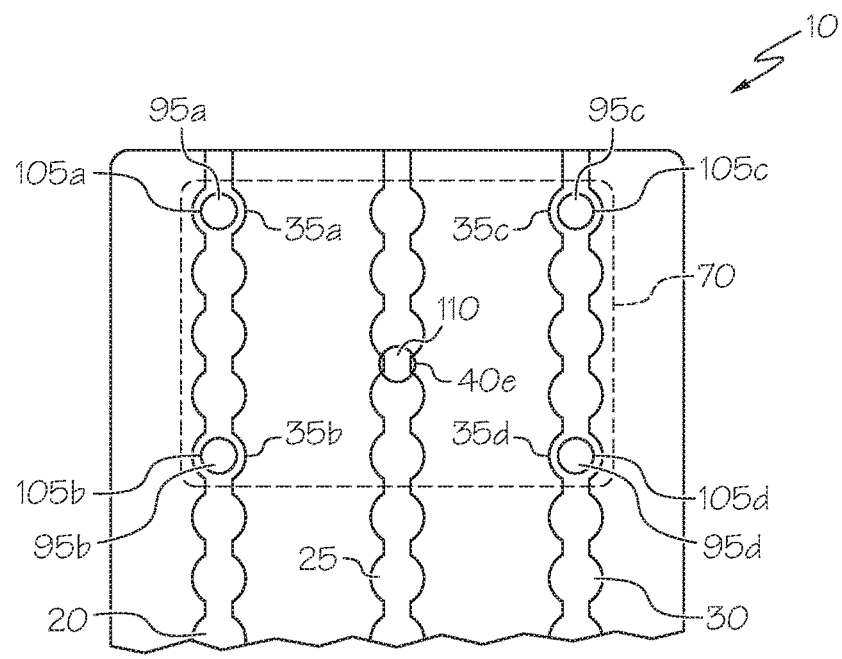
FIGS. 5 and 6 illustrate the interaction between the track of FIG. 1 and the mount of FIG. 3 according to one or more embodiments shown and described herein.
Figure 6:
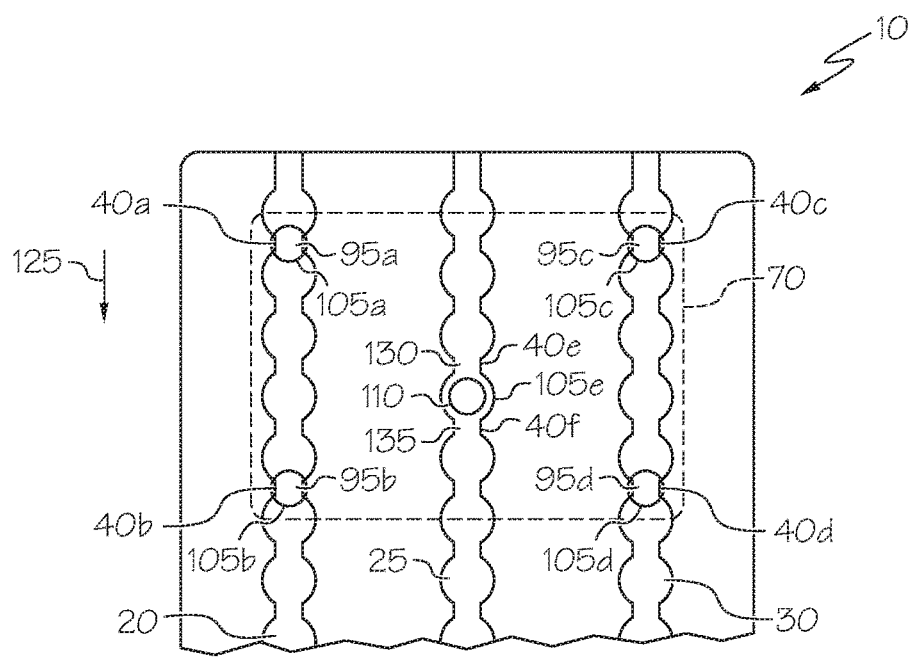

Referring to FIGS. 5 and 6, the track 10 and the mount 70 provide an out-of-phase configuration that is used to lock the mount 70 to the track 10. Referring to FIG. 5, when the enlarged head portions 105a, 105b, 105c and 105d of the mounting studs 95a, 95b, 95c and 95d of the mount 70 are inserted within the plurality of open regions 35a, 35b, 35c and 35d of the left slot 20 and the right slot 30 respectively. The locking pin 110 is prevented from entering the center slot 25 due to its alignment with the necked-down region 40e. In some embodiments, placing the enlarged head portions 105a, 105b, 105c and 105d in the left slot 20 and the right slot 30 respectively, causes the locking pin 110 to retract from its outwardly biased, extended position.

Referring to FIG. 6, the stem portions 100 (not shown) of the mounting studs 95a, 95b, 95c and 95d are sized to slide through the necked-down region 40a, 40b, 40c, and 40d respectively while the enlarged head portions 105a, 105b, 105c and 105d remain in the left slot 20 and the right slot 30 respectively. Movement of the mount 70 downwardly in the direction of arrow 125 aligns the enlarged head portions 105a, 105b, 105c and 105d with necked-down regions 40a, 40b, 40c, and 40d of the left slot 20 and the right slot 30 respectively and aligns the locking pin 110 with the enlarged head opening 105e of the center slot 25. The width of the locking pin 110 may be greater than the upper passageway 130 and the lower passageway 135 through the necked-down regions 40e and 40f adjacent the enlarged head opening 105e, which prevents further movement of the mount 70 once the locking pin 110 passes through the enlarged head opening 105e and into the center slot 25. In embodiments where the locking pin 110 is biased toward its extended position, the locking pin 110 may snap into its extended position automatically once the locking pin 110 is aligned with the enlarged head opening 105e. An operator can retract the locking pin 110 out of the center slot 25 by actuating any of the locking pin releases 115 and/or 120 described above and again move the mount 70 along the track 10 to a different elevation.

While FIGS. 5 and 6 illustrate a mount 70 being secured to the track 10 using four mounting studs 95a, 95b, 95c and 95d and one locking pin 110, it should be appreciated that any other number of mounting studs and locking pins may alternatively be employed. Such an embodiment may allow for a secured connection under increased loads by providing more points of contact between the mount 70 and the track 10. In another embodiment, the mount 70 may incorporate eight mounting studs 95 evenly distributed about the mounting plate 80. In yet another embodiment, any other number of mounting studs 95 may be disposed on the mounting plate 80 that allows for a releasable connection with the track 10. The enlarged head portions 105 are sized to be received through the plurality of open regions 35 of the slots 20, 25 and 30 and may be captured behind necked-down regions 40, while the stem portions 100 are sized to pass by the necked-down regions 40 of the slots 20, 25, and 30.

Figure 7:
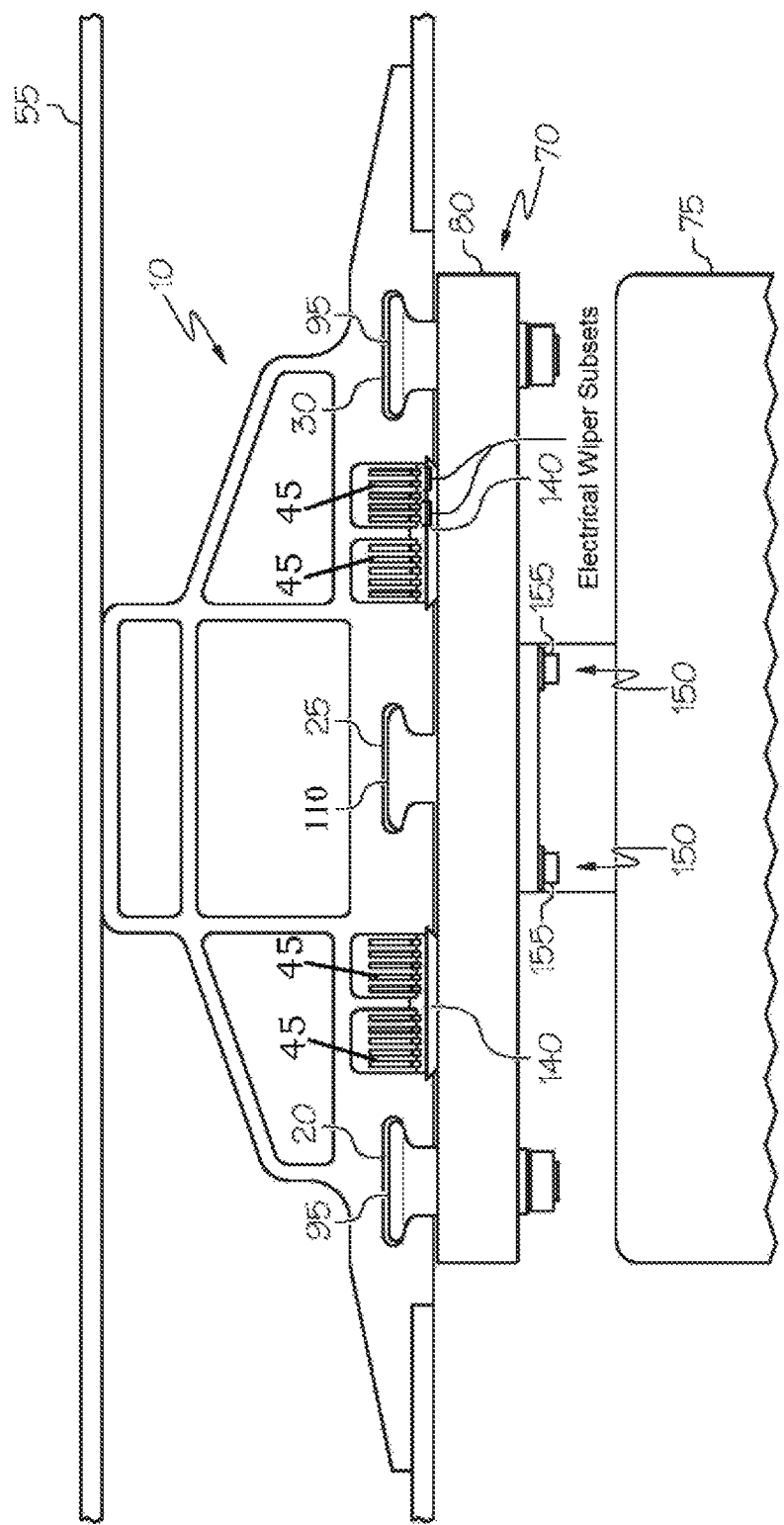
FIG. 7 is a side view of the mount and track locked together according to one or more embodiments shown and described herein.

FIG. 7 is a side view of the mount 70 and track 10 locked together as described in FIGS. 5 and 6. The plurality of mounting studs 95 attached to the mount 70 are locked into the three slots, 20, 25, and 30 of the track 10. A plurality of equipment fasteners 155 may be used to secure the piece of equipment 75 to the mounting plate 80 of the mount 70 via the plurality of equipment mounting locations 150. The terminal mount 140 may be biased outwardly away from the back surface 85. The biasing force ensures that the plurality of electrical wipers 145 are electrically coupled to the plurality of electrical contacts 45. As shown, for example, the number of electrical wipers 145 equals the number of electrical contacts 45. The plurality of electrical wipers may have a subset of electrical wipers electrically coupled to a power source and a co-existing subset of electrical wipers that are electrically coupled to a data source or data sources.

Figure 8:
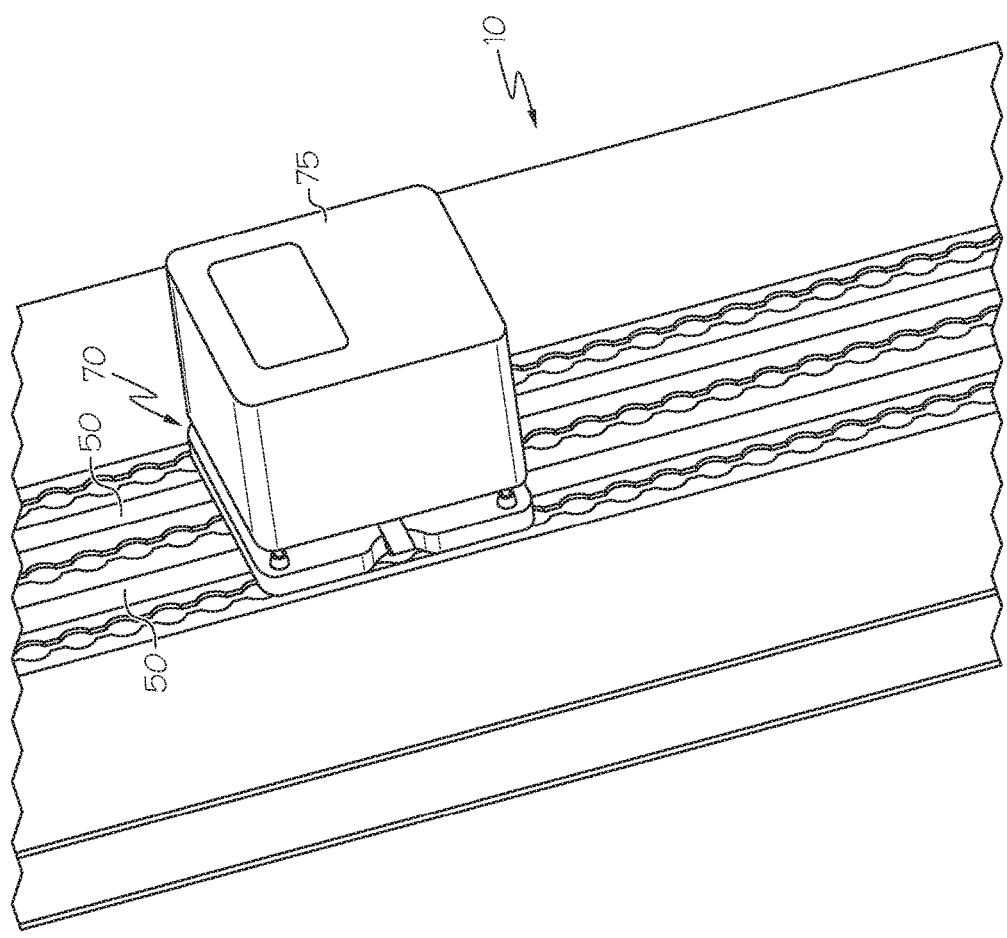
FIG. 8 depicts the piece of equipment attached to the track using a mount according to one or more embodiments shown and described herein.

FIG. 8 depicts the piece of equipment 75 attached to the track 10 using a mount 70. The covers 50 are shown insulating the plurality of electrical contacts 45 (FIG. 1) around the piece of equipment 75 resulting in only the plurality of electrical wipers 145 being electrically coupled to the plurality of electrical contacts.

Figure 9:
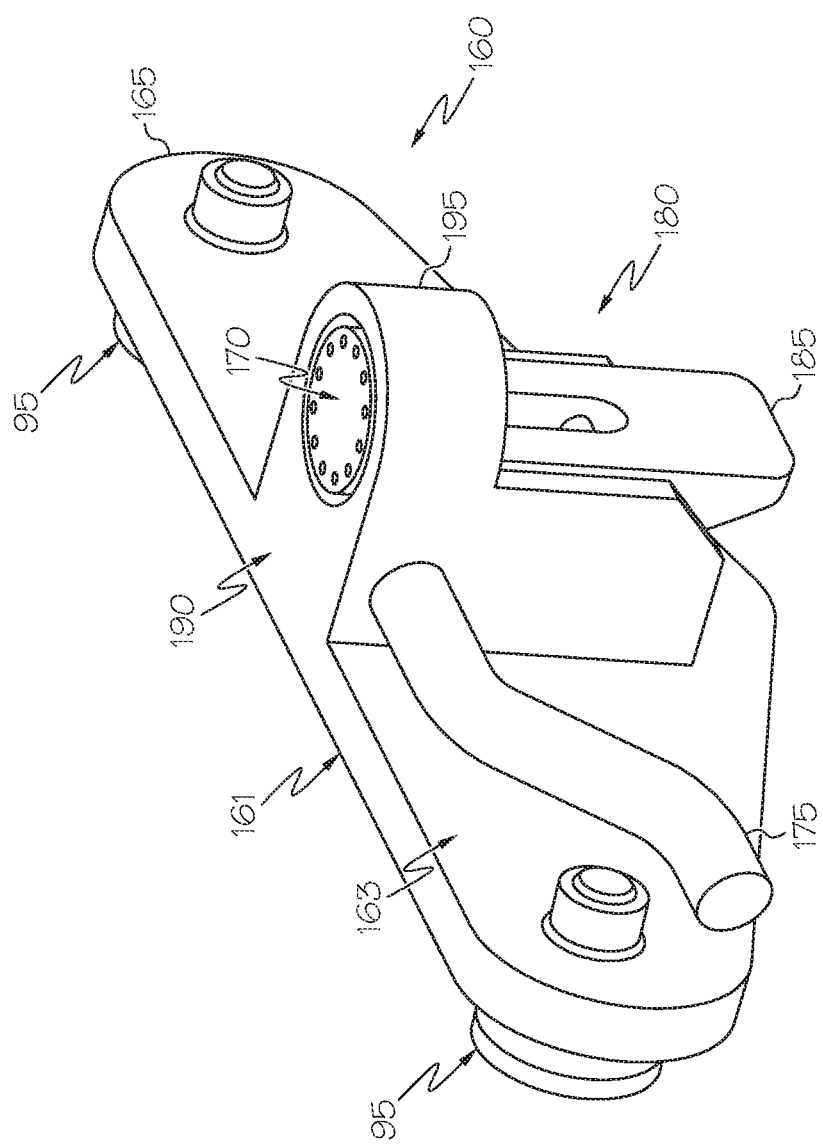
FIG. 9 depicts a perspective view of an electrical adaptor according to one or more embodiments shown and described herein.
Figure 11:
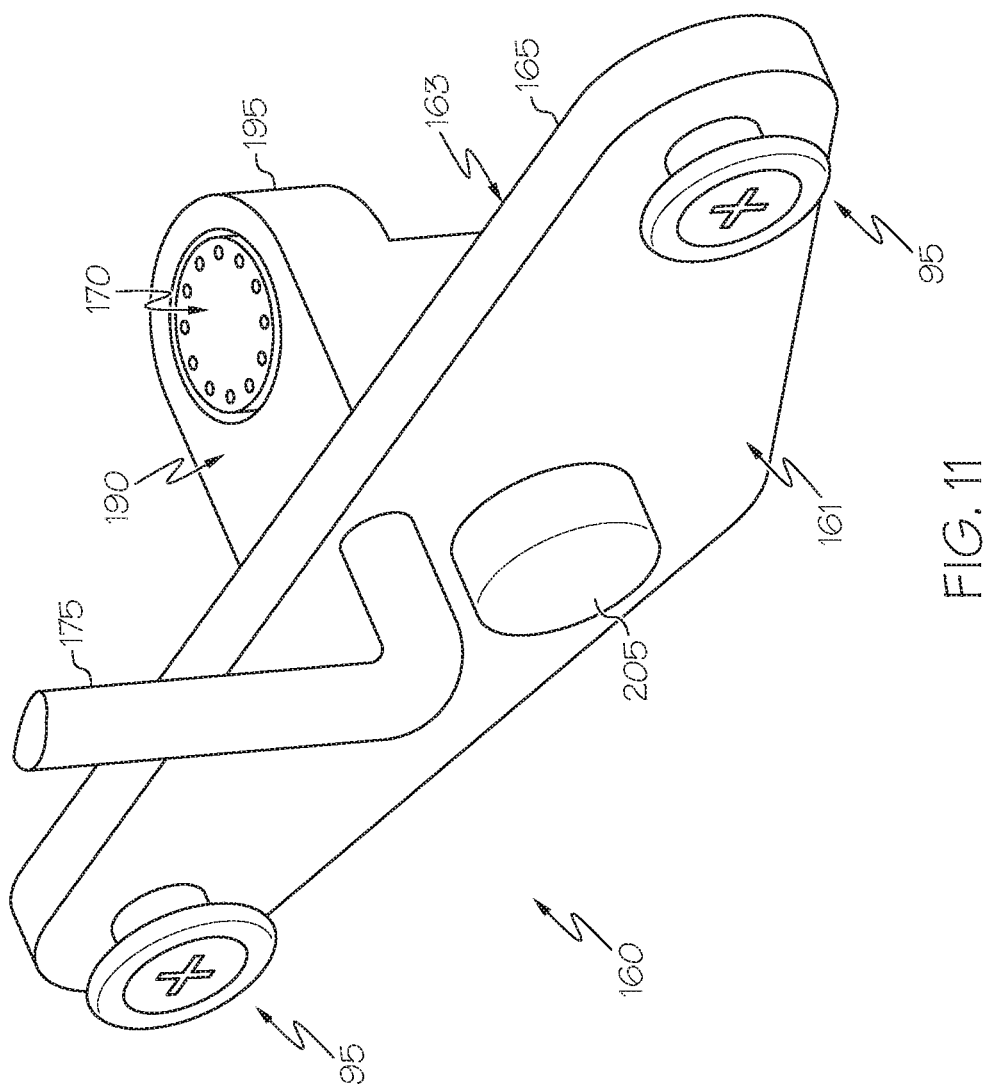
FIG. 11 illustrates a second embodiment of the electrical adaptor according to one or more embodiments shown and described herein.

FIG. 9 depicts a perspective view of an electrical adaptor 160. The electrical adaptor 160 may be used to electrically couple the piece of equipment 75 (FIG. 4) to a power source or a data source. A connector plate 165 serves as a base for the at least one mounting stud 95 and a locking mechanism 180. The at least one mounting stud 95 may be secured to the first side 161 of the connector plate 165. The locking mechanism 180 may be coupled to the second side 163 of the connector plate 165. The locking mechanism 180 has a handle 185 that is operatively coupled to an adaptor locking pin 205 (FIG. 11). The adaptor locking pin 205 may be disposed through the connector plate 165 and extends outwardly from the first side 161. The locking mechanism 180 secures the electrical adaptor 160 to the track 10 or the fixed position plate 250 (FIG. 11). The handle 185 is shown in the seated position in FIG. 9. When the handle 185 is in the seated position, the adaptor locking pin 205 is in a locked position or an extended position, i.e., the adaptor locking pin 205 extends outwardly from the first side 161. When the handle 185 is moved to the unseated position, it moves the adaptor locking pin 205 to an unlocked position or a retracted position, i.e., the adaptor locking pin 205 is flush with the first side 161. When the handle 185 is moved from the unseated to the seated position, the adaptor locking pin 205 moves from the unlocked position (or retracted position) to the locked position (or extended position). In alternative embodiments, the handle 185 and/or the adaptor locking pin 205 may be biased to the seated position and/or the locked position as set forth above using a biasing member, including but not limited to one or more springs, resilient materials, combinations thereof, etc. As an example, the handle 185 may compress a spring to provide the biasing force needed to extend or retract the adaptor locking pin. In other embodiments, the handle 185 may actuate a cam (not shown) that extends or retracts the adaptor locking pin.

The electrical conductor 175 electrically couples with a plurality of second electrical terminals 170. The plurality of second electrical terminals 170 may be mounted on the connector plate 165. In some embodiments, the plurality of second electrical terminals may be located on a front face 190 of the electrical adaptor 160 in a second terminal housing 195. In some embodiments, the plurality of second electrical terminals 170 may protrude from the front face 190 when the handle 185 is in the seated position and be recessed when the handle 185 is in the unseated position.

Figure 10:
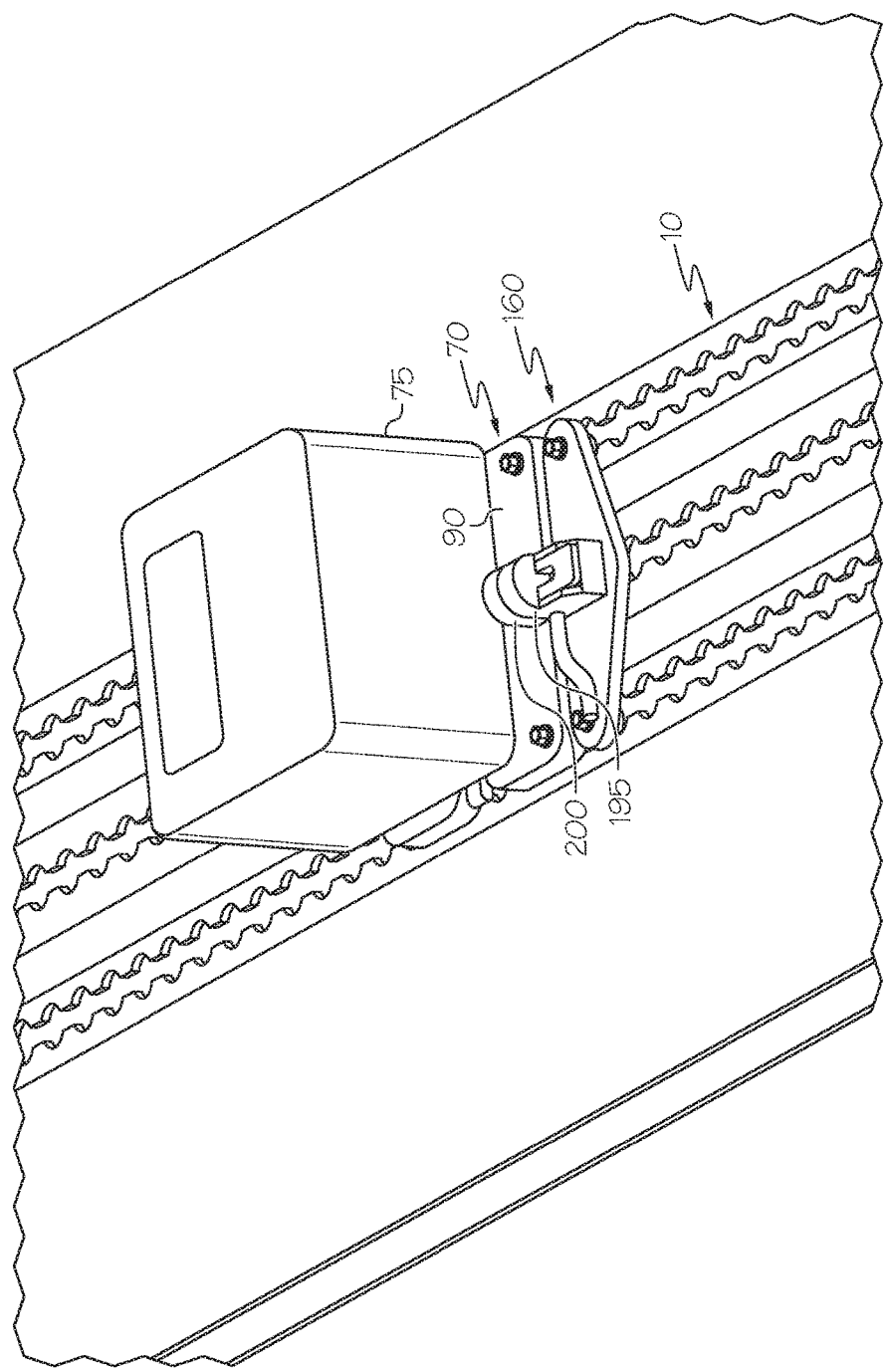
FIG. 10 illustrates the electrical adaptor attached to the track and electrically coupled to the mount according to one or more embodiments shown and described herein.
Figure 17:
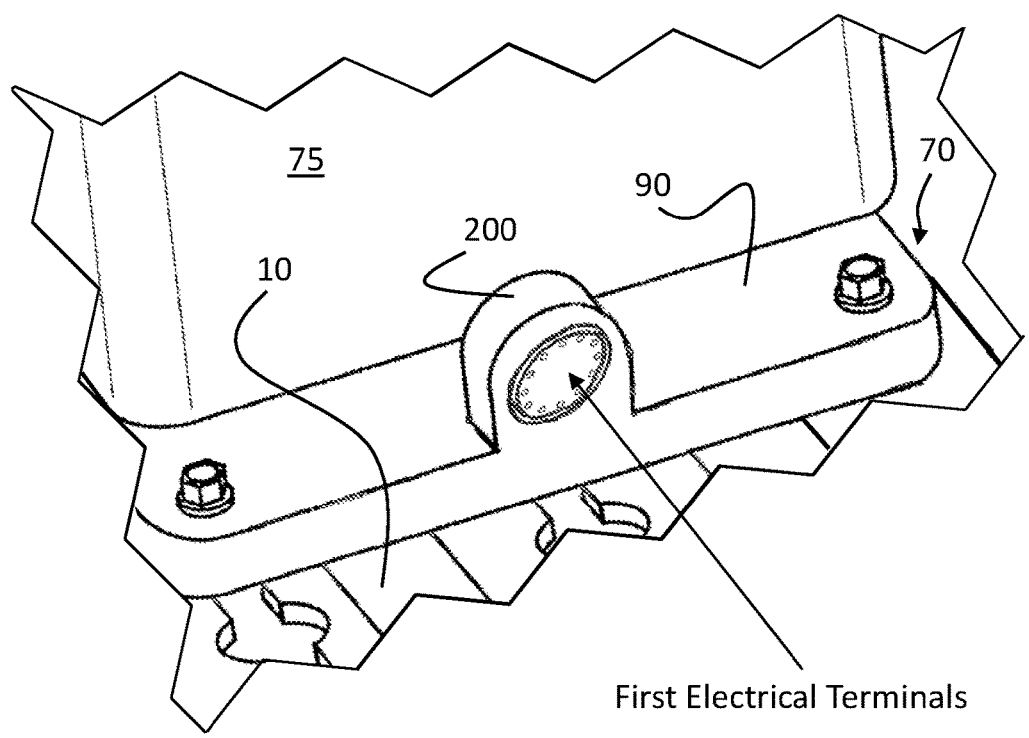
FIG. 17 depicts electrical terminals of a terminal housing coupled to a front surface of a mount.

FIG. 10 illustrates the electrical adaptor 160 attached to the track 10 and electrically coupled to the mount 70. The electrical connector may be a first terminal housing 200 coupled to the front surface 90 which includes a plurality of first electrical terminals (FIG.17). The plurality of first electrical terminals and the plurality of second electrical terminals 170 align and electrically couple when the electrical adaptor 160 is placed on the track 10 and the handle 185 is in the seated position. For example, the first terminal housing 200 and the second terminal housing 195 are aligned when secured to the track 10. It should be understood that the mount 70 is already locked into place but the disclosure is not limited to the mount 70 being placed on the track 10 first. The plurality of first electrical terminals and the plurality of second electrical terminals electrically couple the power source and / or data source or data sources to the piece of equipment 75. Alternatively, the plurality of first electrical terminals and the plurality of second electrical terminals each may have a subset of electrical terminals electrically coupled to a power source and a co-existing subset of electrical terminals that are electrically coupled to a data source or data sources. In some embodiments, the plurality of first electrical terminals and the plurality of second electrical terminals may be a set of male and female plugs or they may be a set of electrically conductive rings or pads.

FIG. 11 illustrates another embodiment of the electrical adaptor 160 where the electrical conductor 175 uses the center slot 25 of the track 10 as shown in FIG. 1 as a raceway to manage and secure the electrical conductor 175. The electrical conductor 175 protrudes from the first side 161 of the connector plate 165. It should be understood that the electrical conductor 175 may protrude from the first side 161 in any location to allow the use of any of the three slots 20, 25, or 30 as a raceway. There may also be more than one electrical conductor 175 protruding from the first face 161. The adaptor locking pin 205 is shown protruding from the first side 161 in the locked position or an extended position as described in FIG. 9. The adaptor locking pin 205 serves a similar function to the locking pin 110 of the mount 70 as shown in FIG. 4. The electrical conductor 175 electrically couples with the plurality of second electrical terminals 170.

Figure 12:
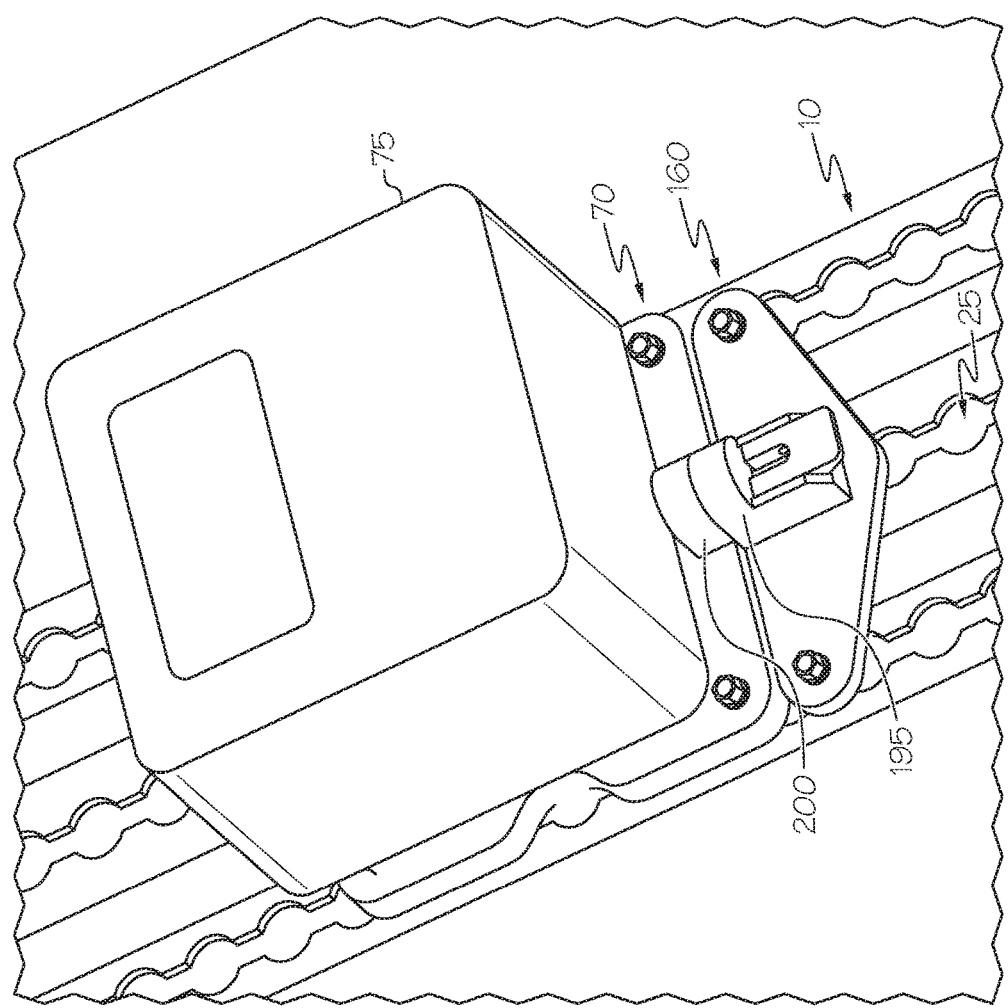
FIG. 12 depicts the second embodiment of the electrical adaptor attached to the track and electrically coupled to the mount according to one or more embodiments shown and described herein.

Referring now to FIG. 12, the electrical adaptor 160 with the electrical conductor 175 using the center slot 25 as a raceway is shown. Comparing this figure to FIG. 10, the electrical conductor 175 is managed and secured with the center slot 25 or alternatively the electrical conductor 175 may enter one of the plurality of raceway access points 65 (FIG. 3) and use the plurality of wire raceways 60 to manage and secure the electrical conductor 175. The plurality of first electrical terminals and the plurality of second electrical terminals electrically couple a power source and/or data source to the piece of equipment 75. When the electrical adaptor 160 is placed on the track 10 such that the first terminal housing 200 and the second terminal housing 195 are aligned and the handle 185 is in the seated position, the plurality of first electrical terminals and the plurality of second electrical terminals 170 align and electrically couple together. In some embodiments, the plurality of first electrical terminals and the plurality of second electrical terminals may be a set of male and female plugs or they may be a set of electrically conductive rings or pads.

FIG. 13 is a front view a fixed position plate 250, as an alternative to the track 10. The fixed position plate 250 may be removably couple or attach to a mount 70 of FIG. 4 or the electrical adaptor 160 of FIG. 9. The fixed position plate 250 may include any suitable mounting structure or fastening device for securing it to a surface. Fastening devices include but are not limited to screws, bolts, rivets, nails, adhesive, Velcro, weld, epoxy, or any similar devices that mechanically joins or affixes two or more objects together. Mounting structure includes but is not limited to a dove tail, hook and slot, tongue and groove, slideable coupled members, pin and slot, or any similar devices. In this illustrative embodiment, the fixed position plate 250 incorporates four mounting holes 255*a*-*d*, to secure the fixed position plate 250 to the surface. The fixed position plate 250 also includes slots in the form of keyhole slots 260, 265, 270, and 275, each with an enlarged head opening 280 and a necked-down portion 285. The enlarged head opening 280 of the keyhole slots 260, 265, 270, and 275 are sized and arranged to receive the enlarged head portions 105*a*, 105*b*, 105*c*, and 105*d*, of FIG. 4 therethrough and the necked-down portions 285 are sized to allow the stem portions 100 of FIG. 4 to slide therein with the enlarged head portions 105*a*, 105*b*, 105*c*, and 105*d*, captured within the necked-down portions 285. A locking pin opening 290 may be provided that is sized to receive the locking pin 110 of FIG. 4 when the locking pin 110 is aligned with the locking pin opening 290.

Figure 14:
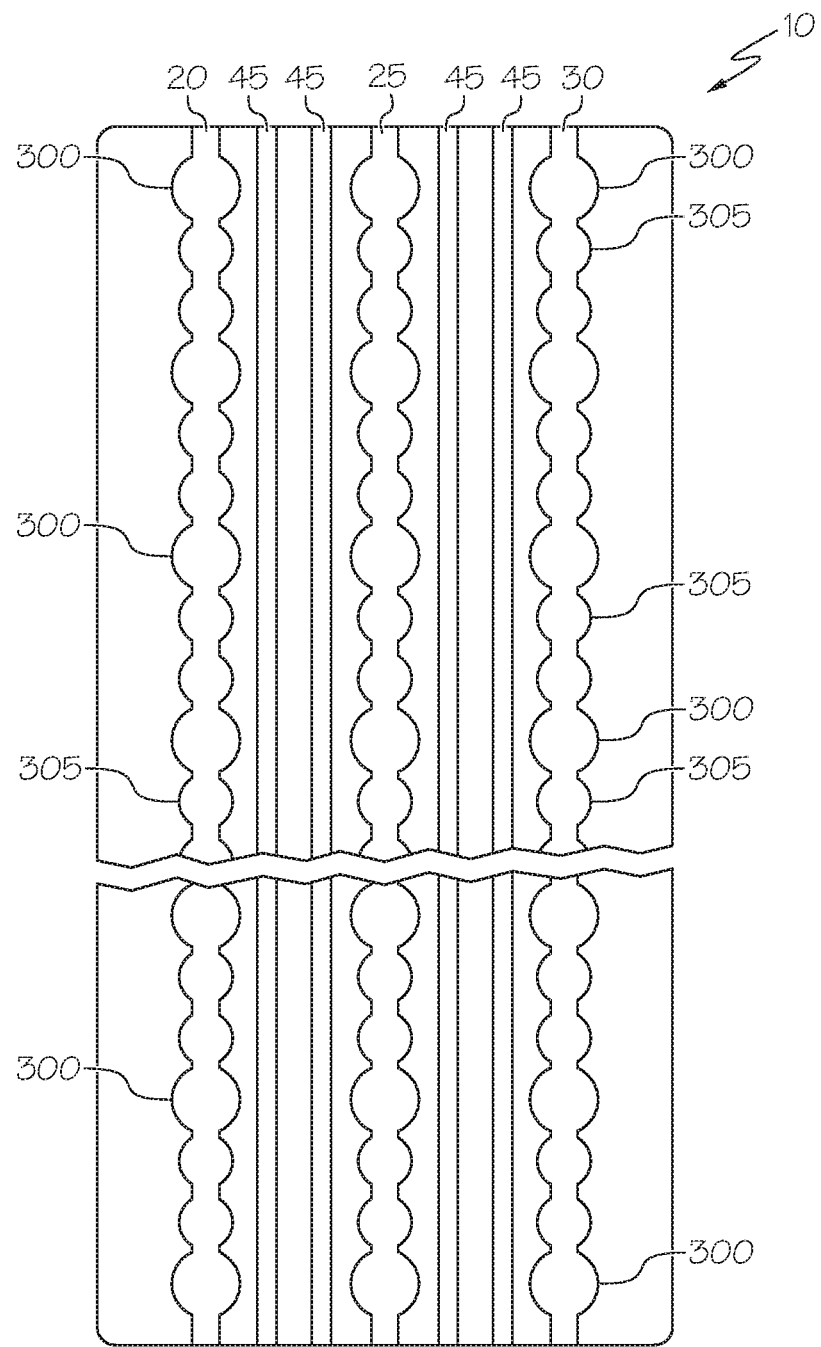
FIG. 14 depicts a front view of the track with a plurality of target open regions and non-target open regions.

FIG. 14 depicts the track 10 with a plurality of target open regions 300 and non-target open regions 305. The left slot 20 and the right slot 30 may include the target open regions 300 to accommodate the mounting stud 95 of FIG. 4 or similar studs. In some embodiments, the target open regions 300 allow the mount 70 with a piece of equipment attached to it to slideably couple with the track 10 without the need for line of sight alignment of the mounting studs 95 with the open regions 35 of FIG. 1. The target open region 300 are larger in diameter and/or size than the non-target open regions 305, which allows for more variability in the orientation of the mount 70 to the track 10 and still enables the correct engagement between the track 10 and the mount 70. The target open regions 300 would not change the alignment of the terminal mount 140 to the plurality of electrical contacts 45. In alternative embodiments (not shown), the track 10 may not include the non-target open regions 305. It may include only a certain number of the target open regions 300 along tracks 20 and 30 and a neck down region running between the certain number of target open regions 300.

Figure 15:
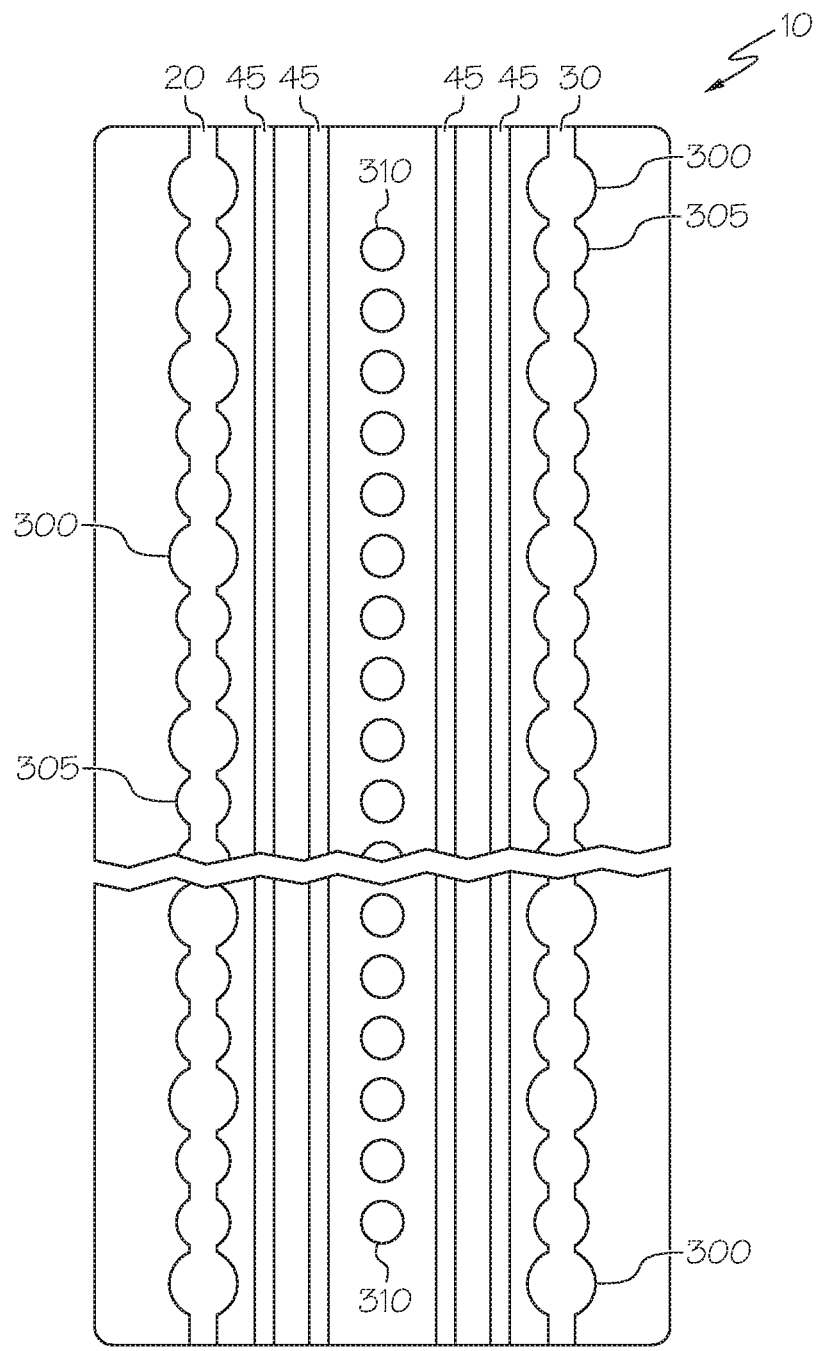
FIG. 15 depicts a front view of the track 10 with a plurality of lock holes.

FIG. 15 depicts the track 10 with a plurality of lock holes 310. The center slot 25 as shown in FIG. 14 may be replaced with the plurality of lock holes 310 to allow the locking pin 110 of FIG. 4 to slideably couple an individual lock hole 310 to secure the mount 70 to the track 10. In some embodiments, the left slot 20 and the right slot 30 may have the plurality of target open regions 300, and non-target open regions 305 but they are not required. The alignment of the terminal mount 140 to the plurality of electrical contacts 45 would not change.

Figure 16:
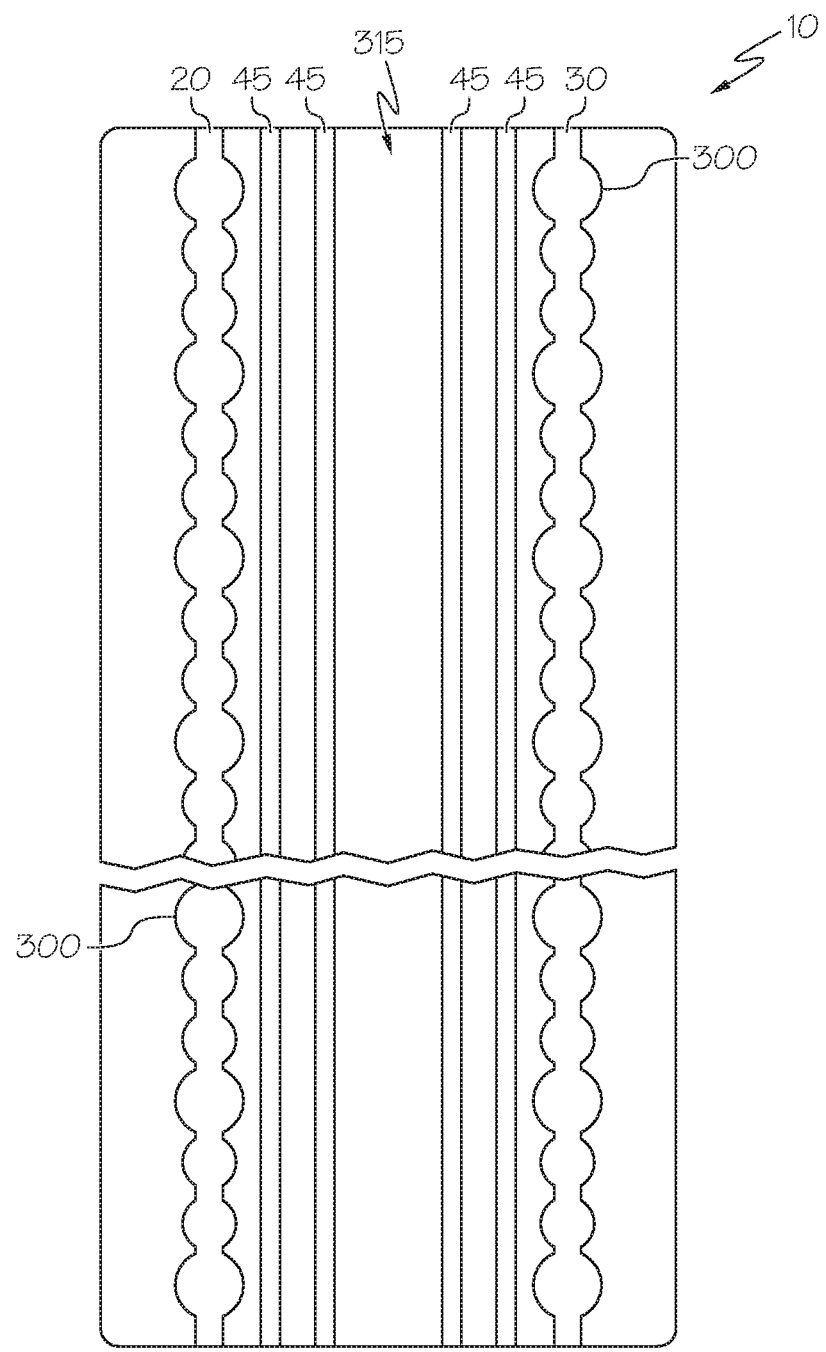
FIG. 16 depicts a front of the track 10 without a center slot.

FIG. 16 depicts the track 10 without a center slot 25 as shown in FIG. 14. The left slot 20 and the right slot 30 may have the plurality of target regions 300 and the non-target open regions 305 but they are not required. A flat surface 315 allows for the locking pin 110 of FIG. 4 to apply a biasing force to an even surface to create an interference fit between the mounting studs 95 and the necked-down regions 40 of the left slot 20 and the right slot 30. The biasing force exerts a force to separate the mount 70 from the track 10. The interference fit or friction fit, is a fastening device that fastens two parts by friction after the parts are pushed together. The alignment of the terminal mount 140 to the plurality of electrical contacts 45 would not change.

It should be understood that the application is not limited to the details or methodology set forth in the description or illustrated in the figures. It should also be understood that the terminology is for the purpose of description only and should not be regarded as limiting. Certain terminology is used in the following description for convenience only and is not limiting. The words "left", "right", "front", "back", "upper", and "lower" designate directions in the drawings to which reference is made. The terminology includes the words noted above as well as derivatives thereof and words of similar import.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A mount comprising:
   a mounting plate with a back surface and a front surface;
   at least one mounting stud coupled to the back surface of the mounting plate, each mounting stud includes a stem portion that extends outwardly from the back surface and an enlarged head portion disposed at a distal end of respective stem portions; and
   at least one terminal mount disposed on the back surface and configured to be electrically coupled to a piece of equipment and further comprising a plurality of electrical wipers coupled to the at least one terminal mount, each electrical wiper is configured to be electrically coupled to the piece of equipment.

2. The mount of claim 1, wherein the plurality of electrical wipers has a subset of electrical wipers configured to be electrically coupled to a power source and a co-existing subset of electrical wipers that are configured to be electrically coupled to a data source or data sources.

3. The mount of claim 1, further comprising a release mechanism comprising a locking pin disposed through the mounting plate and extending outwardly from the back surface and
   at least one locking pin release configured to be operatively connected to the locking pin.

4. The mount of claim 1, further comprising a plurality of equipment mounting locations disposed through the mounting plate configured to secure the piece of equipment to the mount to the front surface.

5. A mount comprising:
   a mounting plate with a back surface and a front surface;
   at least one mounting stud coupled to the back surface of the mounting plate, each mounting stud includes a stem portion that extends outwardly from the back surface and an enlarged head portion disposed at a distal end of respective stem portions; and
   a plurality of first electrical terminals coupled to the front surface and configured to be electrically coupled to a piece of equipment.

6. The mount of claim 5, further comprising a plurality of equipment mounting locations disposed through the mounting plate to secure the piece of equipment to the mount to the front surface.

7. The mount of claim 5, further comprising a release mechanism comprising a locking pin disposed through the mounting plate and extending outwardly from the back surface and at least one locking pin release configured to be operatively connected to the locking pin.

8. The mount of claim 7, further comprising an electrical adaptor comprising:
   a connector plate with a first side and a second side;
   at least one mounting stud coupled to the first side of the connector plate;
   a locking mechanism coupled to the second side of the connector plate comprising:
   an adaptor locking pin disposed through the connector plate and extending outwardly from the first side;
   a handle operatively coupled to the adaptor locking pin;
   an electrical conductor protruding from the connector plate and configured to be electrically coupled to a data source or a power source; and
   a plurality of second electrical terminals mounted to the connector plate and configured to be electrically coupled to the electrical conductor wherein when the electrical adaptor is secured adjacent to the mount, the plurality of first electrical terminals are configured to be aligned and electrically couple with the plurality of second electrical terminals.

9. The mount of claim 8, wherein the plurality of first electrical terminals and the plurality of second electrical terminals are chosen from a set of male and female plugs, electrically conducive rings, or electrically conductive pads.

10. The mount of claim 8, wherein the plurality of first electrical terminals and the plurality of second electrical terminals each have a subset of electrical terminals configured to be electrically coupled to the power source and a co-existing subset of electrical terminals that are configured to be electrically coupled to the data source or data sources.

* * * * *